United States Patent
Kanao et al.

(10) Patent No.: US 10,790,522 B2
(45) Date of Patent: Sep. 29, 2020

(54) FUEL CELL MODULE

(71) Applicant: HONDA MOTOR CO., LTD., Tokyo (JP)

(72) Inventors: Yukihisa Kanao, Asaka (JP); Yuki Yoshimine, Wako (JP); Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 764 days.

(21) Appl. No.: 14/984,119

(22) Filed: Dec. 30, 2015

(65) Prior Publication Data

US 2016/0204453 A1   Jul. 14, 2016

(30) Foreign Application Priority Data

Jan. 9, 2015   (JP) ................ 2015-002749

(51) Int. Cl.
| | |
|---|---|
| *H01M 8/04089* | (2016.01) |
| *H01M 8/04014* | (2016.01) |
| *H01M 8/0612* | (2016.01) |
| *H01M 8/04082* | (2016.01) |
| *H01M 8/12* | (2016.01) |
| *H01M 8/124* | (2016.01) |

(52) U.S. Cl.
CPC ... *H01M 8/04097* (2013.01); *H01M 8/04022* (2013.01); *H01M 8/04201* (2013.01); *H01M 8/0618* (2013.01); *H01M 8/0631* (2013.01); *H01M 8/12* (2013.01); *H01M 2008/1293* (2013.01); *H01M 2250/20* (2013.01); *H01M 2300/0077* (2013.01); *Y02E 60/525* (2013.01); *Y02T 90/32* (2013.01)

(58) Field of Classification Search
CPC ......... H01M 8/04097; H01M 8/04022; H01M 8/04201; H01M 8/0618; H01M 8/0631; H01M 8/12; H01M 2008/1293; H01M 2250/20; H01M 2300/0077; Y02E 60/525; Y02T 90/32
USPC ........................................... 429/15
See application file for complete search history.

(56) References Cited

U.S. PATENT DOCUMENTS

| | | | |
|---|---|---|---|
| 2001/0009732 A1* | 7/2001 | Schuler ............. | H01M 8/04007 429/425 |
| 2010/0239925 A1* | 9/2010 | Ohkawara ............... | C01B 3/384 429/423 |

(Continued)

FOREIGN PATENT DOCUMENTS

| | | |
|---|---|---|
| JP | 2001-132565 | 5/2001 |
| JP | 2001-155747 | 6/2001 |

(Continued)

OTHER PUBLICATIONS

Japanese Office Action dated Sep. 11, 2018, with English translation, 6 pages.

*Primary Examiner* — Michael L Dignan
(74) *Attorney, Agent, or Firm* — Rankin, Hill & Clark LLP (57) ABSTRACT

A fuel cell module includes a fuel cell stack, a reformer, and an exhaust gas combustor. The fuel cell module further includes an exhaust gas combustion chamber equipped with the exhaust gas combustor and a preheating unit for heating a raw fuel by combustion exhaust gas produced in the exhaust gas combustor before the raw fuel is supplied to the reformer. The preheating unit forms one surface of the exhaust gas combustion chamber.

6 Claims, 5 Drawing Sheets

(56) References Cited

U.S. PATENT DOCUMENTS

| | | | | |
|---|---|---|---|---|
| 2014/0030620 A1* | 1/2014 | Ogawa | .............. | H01M 8/04268 |
| | | | | 429/425 |
| 2014/0287332 A1* | 9/2014 | Yoshimine | .......... | H01M 8/0625 |
| | | | | 429/414 |
| 2015/0118129 A1* | 4/2015 | Mita | ................... | H01M 8/0675 |
| | | | | 422/625 |
| 2015/0147669 A1* | 5/2015 | Yoshimine | .............. | C01B 3/384 |
| | | | | 429/425 |

FOREIGN PATENT DOCUMENTS

| | | | | |
|---|---|---|---|---|
| JP | 2008-021595 | 1/2008 | | |
| JP | 2009-093923 | 4/2009 | | |
| JP | 2011-175853 | 9/2011 | | |
| JP | 2012-221932 | 11/2012 | | |
| WO | WO 2013/114775 | * 8/2013 | .............. | H01M 8/04 |
| WO | WO-2013187154 A1 * | 12/2013 | ............. | C01B 3/384 |
| WO | WO-2014002472 A1 * | 1/2014 | .......... | H01M 8/0675 |

* cited by examiner

→ : MIXED GAS
---→ : COMBUSTION EXHAUST GAS

FUEL CELL MODULE

CROSS-REFERENCE TO RELATED APPLICATION

This application is based upon and claims the benefit of priority from Japanese Patent Application No. 2015-002749 filed on Jan. 9, 2015, the contents of which are incorporated herein by reference.

BACKGROUND OF THE INVENTION

1. Field of the Invention

The present invention relates to a fuel cell module including a fuel cell stack formed by stacking a plurality of fuel cells for generating electrical energy by electrochemical reactions of a fuel gas and an oxygen-containing gas.

2. Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (hereinafter also referred to as the MEA). The electrolyte electrode assembly is sandwiched between separators (bipolar plates). In use, generally, predetermined numbers of the electrolyte electrode assemblies and the separators are stacked together to form a fuel cell stack.

The SOFC is equipped with a reformer for reforming a raw fuel chiefly containing hydrocarbon to produce a fuel gas, and supplying the fuel gas to the fuel cell stack. For example, a fuel cell system disclosed in Japanese Laid-Open Patent Publication No. 2001-155747 is known. In this fuel cell system, a raw material gas containing a raw fuel (city gas) from a raw fuel source, air from an air compressor, and water vapor from a water tank is heated by a preheating combustor, and the heated raw material gas is supplied to a fuel reformer. The preheating combustor combusts exhaust gas supplied from the fuel cell through an exhaust gas pipe, preheats the raw material gas, and then supplies the heated raw material gas to the fuel reformer.

In this regard, an electric heater for heating the raw material gas is provided between the preheating combustor and the fuel reformer. The electric heater is provided for securing a sufficient amount of preheating for the raw material gas at the time of starting operation of the fuel cell system. That is, for a while after starting operation of the fuel cell stack, since the amount of the exhaust gas from the fuel cells is insufficient for preheating, sufficient preheating cannot be performed only by the preheating combustor.

SUMMARY OF THE INVENTION

In Japanese Laid-Open Patent Publication No. 2001-155747 mentioned above, a dedicated electric heater is used for securing the sufficient amount of preheating for the raw material gas at the time of starting operation. Therefore, the electric heater increases electrical energy consumption for the system, and ON/OFF control for the electric heater is required.

The present invention has been made to solve this type of problem, and an object of the present invention is to provide a fuel cell module having a simple and economical structure which makes it possible to ensure an efficient reforming reaction.

A fuel cell module according to the present invention includes a fuel cell stack, a reformer, and an exhaust gas combustor. The fuel cell stack contains a plurality of fuel cells stacked, the fuel cells generating electrical energy by electrochemical reactions of a fuel gas and an oxygen-containing gas. The reformer reforms a raw fuel chiefly containing hydrocarbon to produce a fuel gas supplied to the fuel cell stack. The exhaust gas combustor combusts the fuel gas discharged from the fuel cell stack as a fuel exhaust gas and the oxygen-containing gas discharged from the fuel cell stack as an oxygen-containing exhaust gas to produce a combustion exhaust gas.

The fuel cell module further includes an exhaust gas combustion chamber equipped with the exhaust gas combustor, and a preheating unit for heating the raw fuel by the combustion exhaust gas produced in the exhaust gas combustor before the raw fuel is supplied to the reformer. Further, the preheating unit forms one surface of the exhaust gas combustion chamber.

In the present invention, the preheating unit forms one surface of the exhaust gas combustion chamber that has the highest temperature in the fuel cell module. Therefore, dissipation of the combustion heat produced in the exhaust gas combustion chamber is reduced, and it becomes possible to recover the exhaust heat efficiently. Thus, with the simple and economical structure, it becomes possible to induce reforming reaction efficiently, and improvement in the power generation efficiency is achieved easily.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
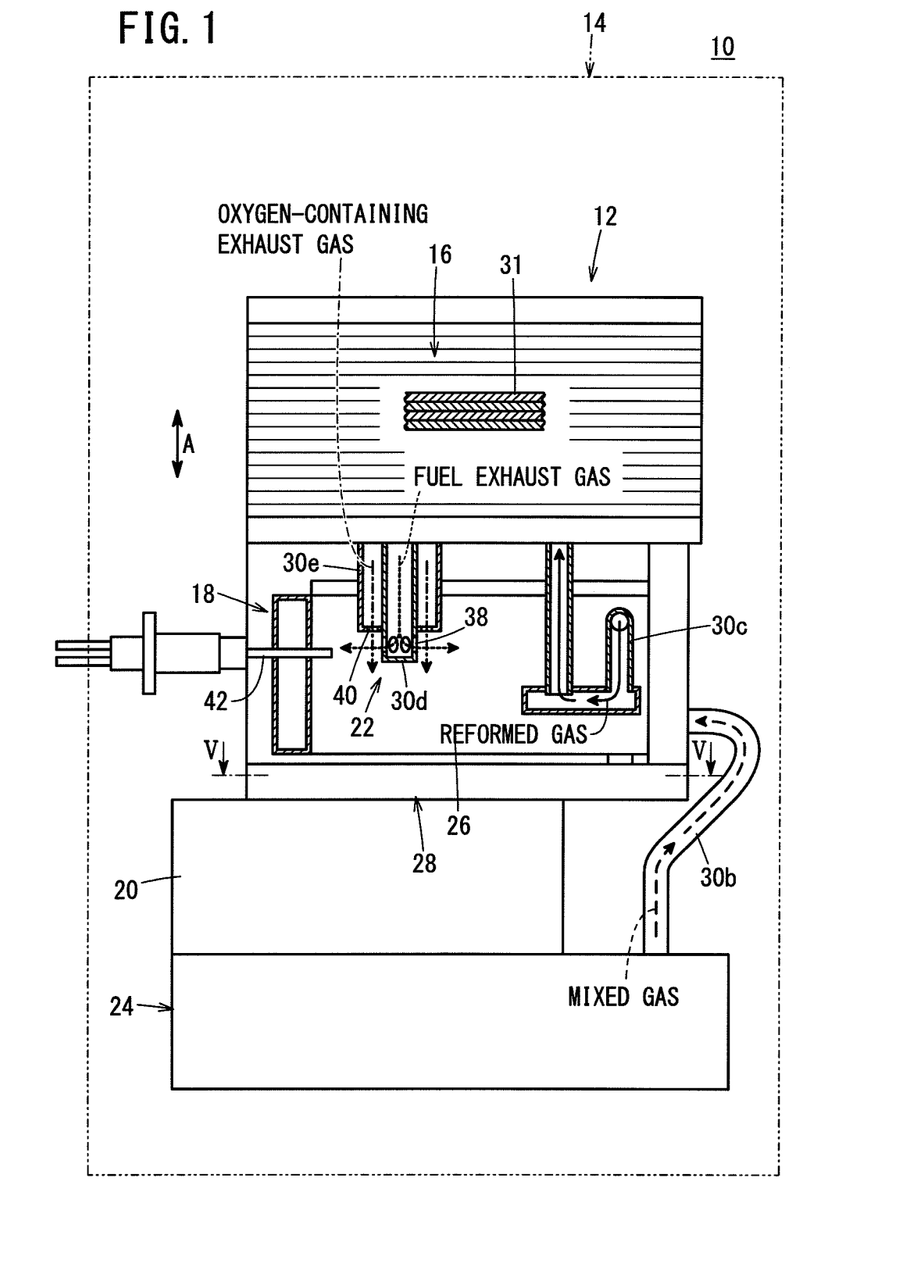
FIG. 1 is a view showing main components of a fuel cell module according to an embodiment of the present invention.

A fuel cell module 10 according to an embodiment of the present invention shown in FIG. 1 may be used in a stationary application. Additionally, the fuel cell module 10 may be used in various applications. For example, the fuel cell module 10 may be mounted in a vehicle. The fuel cell module 10 includes a fuel cell unit 12, and the fuel cell unit 12 is placed in a casing 14.

Figure 2:
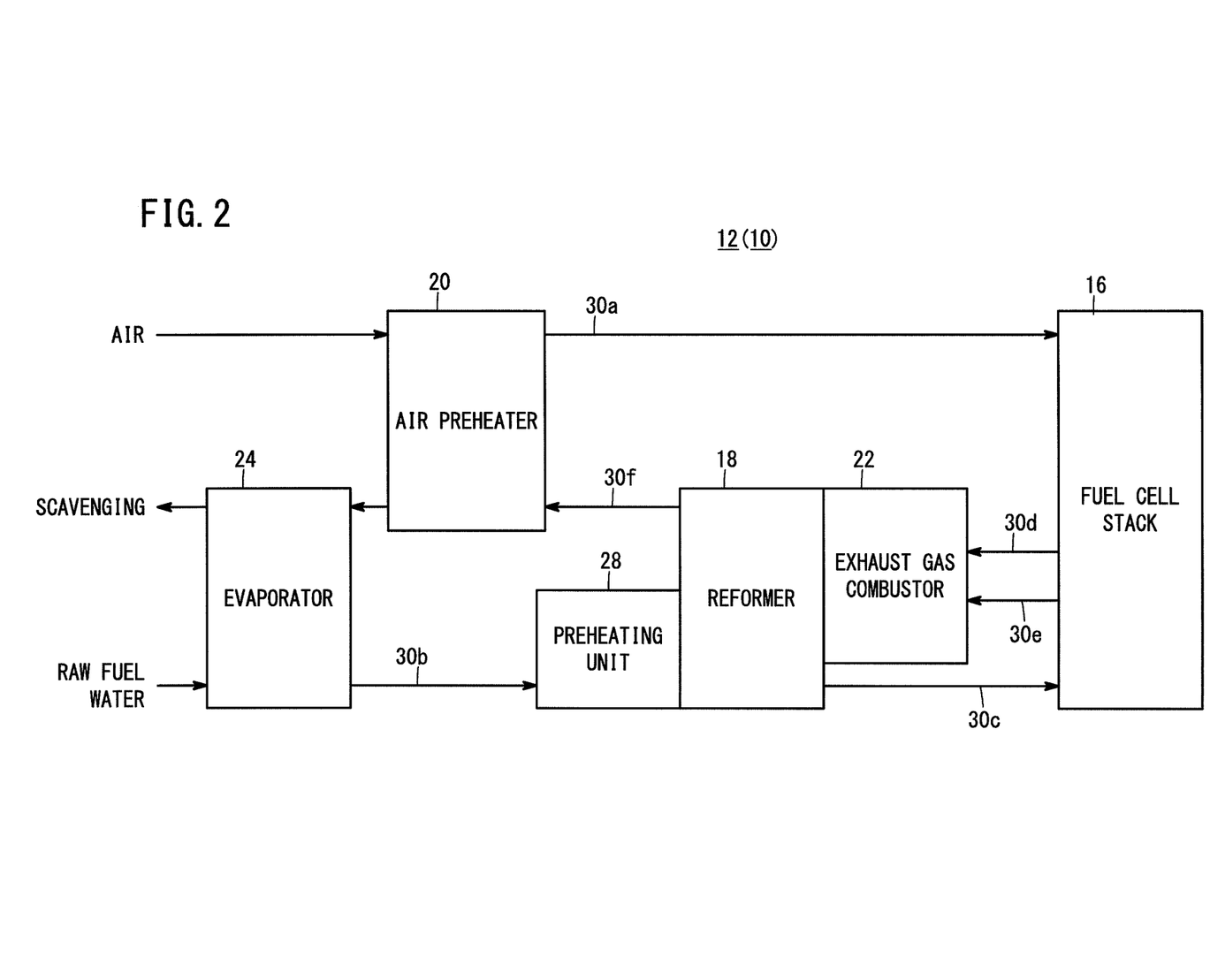
FIG. 2 is a diagram schematically showing structure of the fuel cell module.

As shown in FIGS. 1 and 2, the fuel cell unit 12 is formed by assembling a fuel cell stack 16, a reformer 18, an air preheater 20, an exhaust gas combustor 22, and an evaporator 24 together. The fuel cell unit 12 has a substantially rectangular parallelepiped shape (or a substantially a cubic shape) as a whole. The exhaust gas combustor 22 is provided in an exhaust gas combustion chamber 26, and one surface of the exhaust gas combustion chamber 26 is formed by a preheating unit 28.

As shown in FIG. 2, the air preheater 20 and an oxygen-containing gas channel (not shown) of the fuel cell stack 16 are connected through an air supply pipe 30a. The evaporator 24, the preheating unit 28, and the reformer 18 are connected through a mixed gas supply pipe 30b. The reformer 18 and a fuel gas channel (not shown) of the fuel cell stack 16 are connected through a fuel gas supply pipe 30c. The evaporator 24 is provided upstream of the preheating unit 28 in the flow direction of a raw fuel.

A fuel exhaust gas outlet of the fuel cell stack 16 and the exhaust gas combustor 22 are connected through a fuel exhaust gas pipe 30d. An oxygen-containing exhaust gas outlet of the fuel cell stack 16 and the exhaust gas combustor 22 are connected through an oxygen-containing exhaust gas pipe 30e. The exhaust gas combustor 22 produces a combustion exhaust gas, and the combustion exhaust gas is supplied to the air preheater 20, and then supplied to the evaporator 24 through a combustion gas pipe 30f.

The fuel cell stack 16 generates electrical energy by electrochemical reactions of a fuel gas (mixed gas of a hydrogen gas, methane, and carbon monoxide) and an oxygen-containing gas (air). As shown in FIG. 1, the fuel cell stack 16 includes a plurality of flat-plate-shaped solid oxide fuel cells 31 stacked together in a vertical direction indicated by an arrow A or in a horizontal direction.

For example, each of the fuel cells 31 includes an electrolyte electrode assembly (MEA). The electrolyte electrode assembly includes a cathode, an anode, and an electrolyte interposed between the cathode and the anode. The electrolyte is an ion oxide conductor made of, e.g., stabilized zirconia. The electrolyte electrode assembly is sandwiched between a cathode separator and an anode separator. Part of the oxygen-containing gas channel for supplying an oxygen-containing gas to the cathode is formed in the cathode separator, and part of the fuel gas channel for supplying a fuel gas to the anode is formed in the anode separator.

Figure 3:
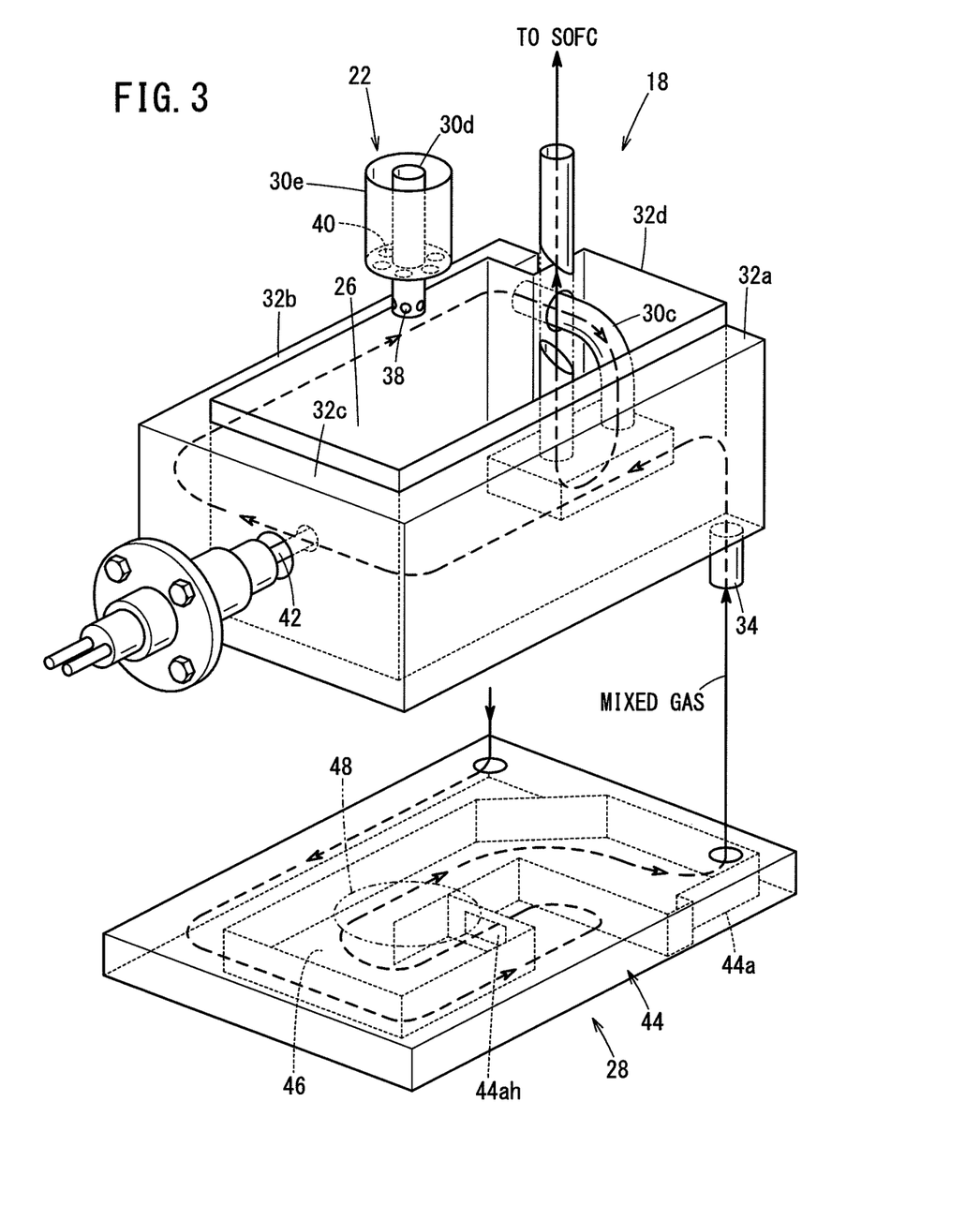
FIG. 3 is an exploded perspective view showing main components of the fuel cell module.
Figure 4:
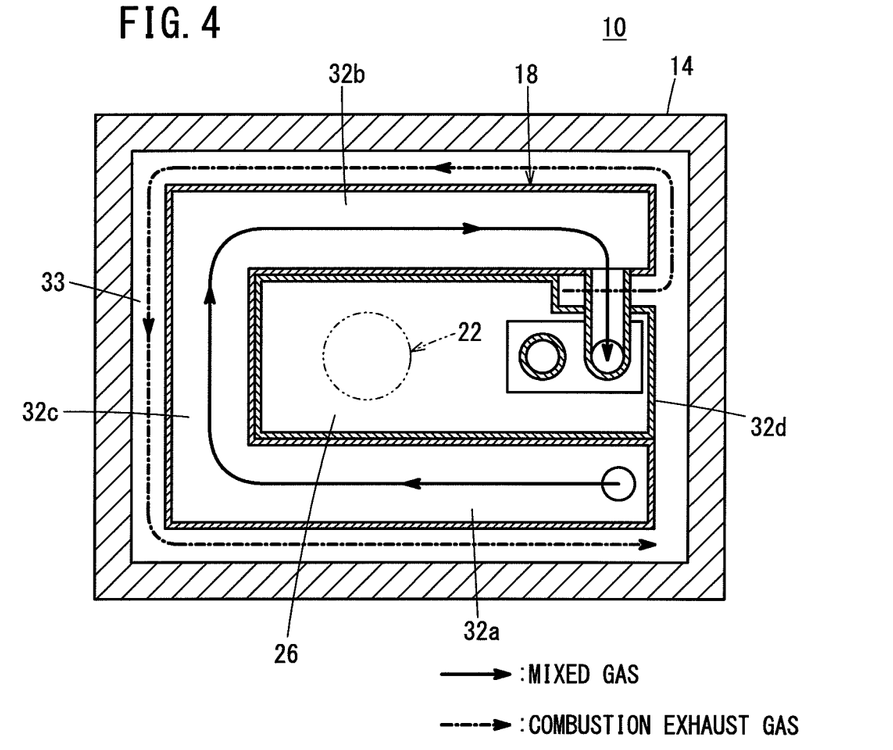
FIG. 4 is a plan view showing an exhaust gas combustion chamber of the fuel cell module.

As shown in FIGS. 1, 3, and 4, the exhaust gas combustion chamber 26 has a cubic shape or a rectangular parallelepiped shape. The fuel cell stack 16 and the preheating unit 28 are provided respectively on opposite sides of the exhaust gas combustion chamber 26. That is, the fuel cell stack 16 and the preheating unit 28 face each other across the exhaust gas combustion chamber 26. The reformer 18 is provided in a substantially U-shape along side surfaces of the exhaust gas combustion chamber 26. Specifically, the fuel cell stack 16 and the preheating unit 28 are provided respectively above and below the exhaust gas combustion chamber 26, and the preheating unit 28 forms a lower surface as one surface of the exhaust gas combustion chamber 26.

As shown in FIGS. 3 and 4, the reformer 18 has hollow side plate sections 32a, 32b extending along long sides of the exhaust gas combustion chamber 26, in parallel with each other. A hollow end plate section 32c is provided integrally with ends of the side plate sections 32a, 32b. Surfaces of the end plate section 32c are oriented in perpendicular to the side plate sections 32a, 32b. A closing plate section 32d is provided at one end where an opening is formed between the side plate sections 32a, 32b. In the illustrated embodiment, the closing plate section 32d has a box shape. Alternatively, the closing plate section 32d may be formed by a single flat plate. As shown in FIG. 4, an exhaust gas flow passage 33 as a passage of the exhaust gas is formed between outer surfaces of the reformer 18 and inner surfaces of the casing 14.

Though not shown, the reformer 18 is filled with reforming catalyst. As the reforming catalyst, at least one catalytic metal selected from Ru (ruthenium), Ni (nickel), Pt (platinum), Rh (rhodium), Pd (palladium), Ir (iridium), and Fe (iron) is used. The reformer 18 performs steam reforming of a mixed gas of a raw fuel chiefly containing hydrogen carbon (e.g., city gas) and water vapor to thereby produce a fuel gas supplied to the fuel cell stack 16.

As shown in FIG. 3, a raw fuel inlet pipe 34 is provided at an end of the side plate section 32a opposite to the end plate section 32c. The raw fuel inlet pipe 34 is connected to the preheating unit 28. A fuel gas supply pipe 30c is provided at one end of the side plate section 32b opposite to the end plate section 32c. The fuel gas supply pipe 30c is connected to the fuel gas channel of the fuel cell stack 16.

As shown in FIGS. 1 and 3, the exhaust gas combustor 22 is connected to a lower portion of the fuel cell stack 16, and arranged at an upper location of the exhaust gas combustion chamber 26. The exhaust gas combustor 22 has a fuel exhaust gas pipe 30d and an oxygen-containing exhaust gas pipe 30e. The fuel exhaust gas pipe 30d is a passage of the fuel gas discharged from the fuel cell stack 16 as a fuel exhaust gas, and the oxygen-containing exhaust gas pipe 30e is a passage of the oxygen-containing gas discharged from the fuel cell stack 16 as an oxygen-containing exhaust gas.

The fuel exhaust gas pipe 30d is an inner pipe, and the oxygen-containing exhaust gas pipe 30e is an outer pipe. The fuel exhaust gas pipe 30d and the oxygen-containing exhaust gas pipe 30e form a double pipe. A plurality of fuel exhaust gas outlet ports (exhaust gas discharge ports) 38 are arranged at equal intervals of angle on an outer circumference of a front end of the fuel exhaust gas pipe 30d. A plurality of oxygen-containing exhaust gas outlet ports (exhaust gas discharge ports) 40 are arranged at a front end of the oxygen-containing exhaust gas pipe 30e on a circle that is concentric with the oxygen-containing exhaust gas pipe 30e. A glow plug 42 is attached to the end plate section 32c of the reformer 18, and a front end of the glow plug 42 is positioned adjacent to the exhaust gas combustor 22.

The air preheater 20 heats the oxygen-containing gas by heat exchange with the combustion exhaust gas, and supplies the oxygen-containing gas to the fuel cell stack 16. Water and the raw fuel are supplied to the evaporator 24. At the evaporator 24, the water is evaporated to produce water vapor. A mixed gas of the water vapor and the raw fuel is supplied to the preheating unit 28 through the mixed gas supply pipe 30b.

Figure 5:
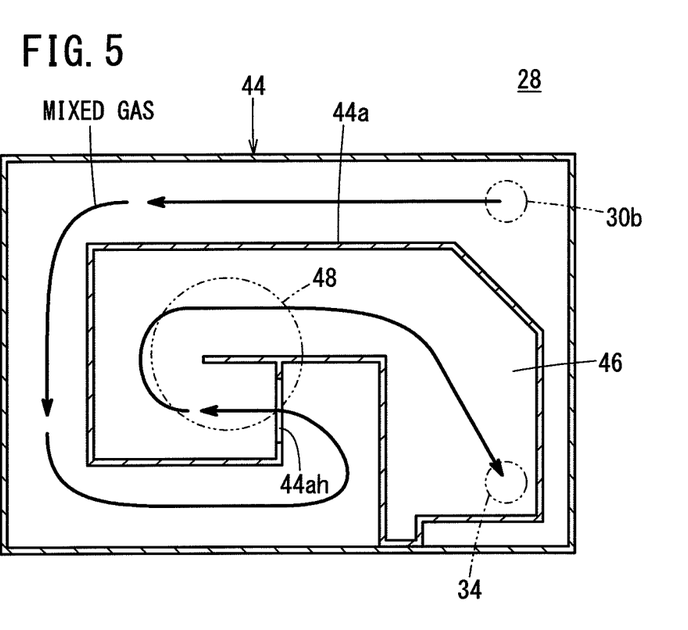
FIG. 5 is a cross sectional view showing the fuel cell module, taken along line V-V in FIG. 1.

As shown in FIGS. 3 and 5, the preheating unit 28 includes a casing member 44 having a cubic shape or a rectangular parallelepiped shape. A spiral-shaped fuel gas preheating passage 46 is formed in the casing member 44 through a partition plate 44a. An opening 44ah is formed at a predetermined position of the partition plate 44a for allowing the raw fuel (mixed gas) containing water vapor to pass through the opening 44ah. The central area (central portion) 48 of the spiral-shaped fuel gas preheating passage 46 is positioned immediately below the fuel exhaust gas outlet ports 38 and the oxygen-containing exhaust gas outlet ports 40, which are exhaust gas discharge ports.

Operation of this fuel cell module 10 will be described below.

As shown in FIGS. 1 and 2, during operation of the fuel cell module 10, air is supplied to the air preheater 20, and the raw fuel and water are supplied to the evaporator 24. Specifically, a combustion exhaust gas described later is supplied to a combustion gas pipe (not shown) of the air preheater 20, and the air as the oxygen-containing gas is supplied to the air preheater 20. The air is heated by the combustion exhaust gas (i.e., heat exchange between the air and the combustion exhaust gas occurs), and the heated air is supplied to the oxygen-containing gas channel of the fuel cell stack 16 through the air supply pipe 30a.

In the meanwhile, the raw fuel such as the city gas (containing $CH_4$, $C_2H_6$, $C_3H_8$, $C_4H_{10}$) and the water are supplied to the evaporator 24. Since the combustion exhaust gas described later is supplied to the evaporator 24, the water is evaporated to produce water vapor, and a mixed gas of this water vapor and the raw fuel flows into the preheating unit 28 through the mixed gas supply pipe 30b. In the preheating unit 28, as shown in FIGS. 3 and 5, the spiral-shaped fuel gas preheating passage 46 is formed by the partition plate 44a in the casing member 44. Therefore, the mixed gas flows along the fuel gas preheating passage 46, and the mixed gas is heated by the combustion heat of the combustion exhaust gas.

The heated mixed gas from the fuel gas preheating passage 46 flows through the raw fuel inlet pipe 34, and the mixed gas is supplied to the reformer 18. In the reformer 18, steam reforming of the mixed gas is performed. Hydrogen carbon of $C_{2+}$ is removed (reformed), and a reformed gas chiefly containing methane is obtained. The reformed gas is supplied to the fuel gas channel of the fuel cell stack 16 through the fuel gas supply pipe 30c.

Thus, in each of the fuel cells 31, electrical energy is generated by electrochemical reaction of the oxygen and the air. As shown in FIGS. 1 to 3, the fuel gas consumed in the power generation reaction is discharged from the fuel cell stack 16 as the fuel exhaust gas into the fuel exhaust gas pipe 30d. Likewise, the oxygen-containing gas consumed in the power generation reaction is discharged from the fuel cell stack 16 as the oxygen-containing exhaust gas into the oxygen-containing exhaust gas pipe 30e.

As shown in FIGS. 1 and 3, the fuel exhaust gas flows from the fuel exhaust gas outlet ports 38 of the fuel exhaust gas pipe 30d into the exhaust gas combustion chamber 26. In the meanwhile, the oxygen-containing exhaust gas flows from the oxygen-containing exhaust gas outlet ports 40 of the oxygen-containing exhaust gas pipe 30e into the exhaust gas combustion chamber 26. Thus, in the exhaust gas combustion chamber 26, the fuel exhaust gas and the oxygen-containing exhaust gas are mixed together and combusted to produce the combustion exhaust gas. Incidentally, the glow plug 42 is operated as necessary in the exhaust gas combustion chamber 26, and the mixed gas of the fuel exhaust gas and the oxygen-containing exhaust gas is ignited.

The combustion exhaust gas flows inside the reformer 18, and through the exhaust gas flow passage 33 (see FIG. 4) to thereby heat the reformer 18 and transmit the combustion heat to the preheating unit 28. Further, the combustion exhaust gas is supplied to the air preheater 20 and then to the evaporator 24 through the combustion gas pipe 30f (see FIG. 2). Thus, the combustion heat is transmitted to the air preheater 20 and the evaporator 24.

In the embodiment of the present invention, as shown in FIGS. 1 and 3, the preheating unit 28 forms one surface of the exhaust gas combustion chamber 26 that has the highest temperature in the fuel cell module 10. Therefore, dissipation of the combustion heat produced in the exhaust gas combustion chamber 26 is reduced, and it becomes possible to recover the exhaust heat efficiently. Thus, in the fuel cell module 10, with the simple and economical structure, it becomes possible to induce reforming reaction efficiently, and improvement in the power generation efficiency is achieved easily.

That is, when the mixed gas is heated by the preheating unit 28, the temperature at the inlet of the reformer 18 is increased. Therefore, the mixed gas is heated beforehand to the active temperature of the catalyst or higher, and the performance of the reforming catalyst is enhanced. Consequently, the required amount of catalyst can be reduced effectively, and thus, size reduction and cost reduction are achieved.

Further, the exhaust gas combustion chamber 26 has a cubic shape or a rectangular parallelepiped shape. In the structure, the fuel cell stack 16 and the preheating unit 28 are provided respectively on opposite sides of the exhaust gas combustion chamber 26. That is, the fuel cell stack 16 and the preheating unit 28 face each other across the exhaust gas combustion chamber 26. The reformer 18 is provided in a substantially U-shape along side surfaces of the exhaust gas combustion chamber 26. Thus, hot combustion heat produced in the exhaust gas combustion chamber 26 is uniformly transmitted to the entire reformer 18. Consequently, in the reformer 18, the reforming reaction is induced suitably, and the uniform temperature distribution is achieved. Further, it becomes possible to suppress wasteful heat dissipation effectively.

Thus, since degradation of catalyst occurs uniformly, degradation in the reforming rate at the outlet of the reformer 18 is reduced. In the structure, the catalyst usage in the fuel cells is reduced, and degradation of the fuel cell stack and degradation of the power generation efficiency are suppressed suitably. Moreover, heat stress applied to the reformer 18 is reduced effectively.

Further, the fuel cell stack 16 and the preheating unit 28 are provided respectively above and below the exhaust gas combustion chamber 26, and the preheating unit 28 forms a lower surface of the exhaust gas combustion chamber 26. In the structure, hot combustion heat produced in the exhaust gas combustion chamber 26 is transmitted to the preheating unit 28. Consequently, exhaust heat recovery can be performed efficiently, and the process of heating the raw fuel can be performed reliably.

Moreover, the preheating unit 28 has the casing member 44, and the spiral-shaped fuel gas preheating passage 46 is formed by the partition plate 44a in the casing member 44. Therefore, the fuel gas preheating passage 46 has a long way in the preheating unit 28. In the structure, it is possible to reliably and easily heat the mixed gas (raw fuel).

Further, the exhaust gas combustor 22 has the fuel exhaust gas outlet ports 38 and the oxygen-containing exhaust gas outlet ports 40 provided at upper positions of the exhaust gas combustion chamber 26 for discharging the fuel exhaust gas and the oxygen-containing exhaust gas from the exhaust gas combustor 22. Further, the central area 48 of the spiral-shaped fuel gas preheating passage 46 of the preheating unit 28 is positioned immediately below the fuel exhaust gas outlet ports 38 and the oxygen-containing exhaust gas outlet ports 40. In the structure, the process of heating the mixed gas flowing through the fuel gas preheating passage 46 is performed efficiently and sufficiently, and it becomes possible to effectively reduce the overall size and the cost of the preheating unit 28.

Further, the fuel cell module 10 has the evaporator 24 for evaporating the water, and supplying the produced water vapor to the reformer 18. The evaporator 24 is provided upstream of the preheating unit 28 in the flow direction of the raw fuel (see FIG. 2). Thus, shortage or fluctuation of evaporation in the evaporator 24 can be prevented by heat exchange in the preheating unit 28. Accordingly, it becomes possible to stably supply the fuel gas to the reformer 18 without fluctuation in the flow rate.

While the invention has been particularly shown and described with reference to a preferred embodiment, it will be understood that variations and modifications can be effected thereto by those skilled in the art without departing from the scope of the invention as defined by the appended claims.

What is claimed is:

1. A fuel cell module comprising:
   a fuel cell stack comprising a plurality of fuel cells stacked, the fuel cells being configured to generate electrical energy by electrochemical reactions of a fuel gas and an oxygen-containing gas;
   a reformer configured to reform a raw fuel chiefly containing hydrocarbon to thereby produce the fuel gas supplied to the fuel cell stack; and
   an exhaust gas combustor configured to combust the fuel gas discharged from the fuel cell stack as a fuel exhaust gas and the oxygen-containing gas discharged from the fuel cell stack as an oxygen-containing exhaust gas to thereby produce a combustion exhaust gas,
   wherein the fuel cell module further comprises:
   an exhaust gas combustion chamber that is box shaped and equipped with the exhaust gas combustor; and
   a preheating unit that is box shaped and configured to heat the raw fuel by the combustion exhaust gas produced in the exhaust gas combustor before the raw fuel is supplied to the reformer,
   wherein the box shaped preheating unit and the box shaped exhaust gas combustion chamber are separate from each other and arranged adjacent to each other with one wall of the box shaped preheating unit forming one surface of the exhaust gas combustion chamber,
   wherein the exhaust gas combustion chamber has a cubic shape or a rectangular parallelepiped shape,
   wherein the fuel cell stack and the preheating unit are provided respectively on opposite sides of the exhaust gas combustion chamber,
   wherein the exhaust gas combustion chamber has, among surfaces of the cubic shape or the parallelepiped shape, a first surface, a second surface, and a third surface which form a U-shape, where the first surface and the second surface face each other and the third surface connects the first surface and the second surface,
   wherein the reformer is provided, outside the exhaust gas combustion chamber, in a substantially U-shape along the first surface, the second surface, and the third surface of the exhaust gas combustion chamber,
   wherein the one surface of the exhaust gas combustion chamber is adjacent to the first surface, the second surface, and the third surface,
   wherein the reformer includes:
      a first portion that extends along the first surface of the exhaust gas combustion chamber;
      a second portion that extends along the second surface of the exhaust gas combustion chamber; and
      a third portion that extends along the third surface of the exhaust gas combustion chamber and is connected to the first portion and the second portion,
   wherein the exhaust gas combustion chamber is arranged between the first portion and the second portion of the reformer,
   wherein of surfaces that constitute the exhaust gas combustion chamber having the cubic shape or the rectangular parallelepiped shape, four surfaces are covered by the preheating unit and the U-shaped reformer,
   wherein the first portion of the reformer includes an inlet for introducing the raw fuel into the reformer, and the second portion of the reformer includes an outlet for discharging a reformed fuel gas from the reformer,
   wherein the reformer is configured to allow the raw fuel introduced in the reformer to flow, in order, from the first portion to the third portion to the second portion, and
   wherein the exhaust gas combustion chamber and the reformer are directly adjacent to each other, and the exhaust gas combustion chamber and the reformer are configured to transfer a heat of the exhaust gas combustion chamber to the reformer through a wall of the exhaust gas combustion chamber and a wall of the reformer.

2. The fuel cell module according to claim 1, wherein the fuel cell stack and the preheating unit are provided respectively above and below the exhaust gas combustion chamber; and
   the preheating unit forms a lower surface as the one surface of the exhaust gas combustion chamber.

3. The fuel cell module according to claim 1, wherein the preheating unit includes a casing member; and
   a spiral-shaped fuel gas preheating passage is formed by a partition plate in the casing member.

4. The fuel cell module according to claim 3, wherein the exhaust gas combustor has an exhaust gas discharge port provided at an upper position of the exhaust gas combustion chamber, the exhaust gas discharge port being configured to discharge the fuel exhaust gas and the oxygen-containing exhaust gas; and
   a central portion of the spiral-shaped fuel gas preheating passage is positioned immediately below the exhaust gas discharge port.

5. The fuel cell according to claim 1, further comprising an evaporator configured to evaporate water to produce water vapor, and supply the water vapor to the reformer; and
   the evaporator is provided upstream of the preheating unit in a flow direction of the raw fuel.

6. The fuel cell according to claim 1, wherein the one surface of the exhaust gas combustion chamber that is formed by the one wall of the box shaped preheating unit is a lower surface of the exhaust gas combustion chamber.

* * * * *